US011849121B2

(12) United States Patent
Lim et al.

(10) Patent No.: US 11,849,121 B2
(45) Date of Patent: *Dec. 19, 2023

(54) INTER-PREDICTION METHOD AND IMAGE DECODING DEVICE

(71) Applicant: SK TELECOM CO., LTD., Seoul (KR)

(72) Inventors: Jeong Yeon Lim, Seoul (KR); Se Hoon Son, Seoul (KR); Sun Young Lee, Seoul (KR); Tae Young Na, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/865,254

(22) Filed: Jul. 14, 2022

(65) Prior Publication Data

US 2022/0360790 A1 Nov. 10, 2022

Related U.S. Application Data

(63) Continuation of application No. 17/251,315, filed as application No. PCT/KR2019/006796 on Jun. 5, 2019, now Pat. No. 11,425,391.

(30) Foreign Application Priority Data

Jun. 11, 2018 (KR) .................. 10-2018-0066694
Nov. 19, 2018 (KR) .................. 10-2018-0142487
Jun. 3, 2019 (KR) .................. 10-2019-0065415

(51) Int. Cl.
*H04N 19/137* (2014.01)
*H04N 19/105* (2014.01)
*H04N 19/132* (2014.01)
*H04N 19/159* (2014.01)
*H04N 19/176* (2014.01)

(52) U.S. Cl.
CPC ......... *H04N 19/137* (2014.11); *H04N 19/105* (2014.11); *H04N 19/132* (2014.11); *H04N 19/159* (2014.11); *H04N 19/176* (2014.11)

(58) Field of Classification Search
None
See application file for complete search history.

(56) References Cited

U.S. PATENT DOCUMENTS 10,096,130 B2 10/2018 Pio et al.
11,425,391 B2 * 8/2022 Lim ..................... H04N 19/55
(Continued)

FOREIGN PATENT DOCUMENTS

CN 108012155 A 5/2018
KR 10-2017-0096975 A 8/2017
(Continued)

OTHER PUBLICATIONS

International Search Report dated Sep. 24, 2019, corresponding to International Application No. PCT/KR2019/006796.
(Continued)

*Primary Examiner* — Christopher G Findley
(74) *Attorney, Agent, or Firm* — Hauptman Ham, LLP

(57) ABSTRACT

Disclosed are an inter-prediction method and an video decoding device. One embodiment of the present invention provides an inter-prediction method executed in an video decoding device, including deriving a motion vector of a current block based on motion information decoded from a bitstream; acquiring reference samples of a first reference block by using the motion vector, wherein reference samples of an external region located outside a reference picture among the first reference block are acquired from a corresponding region corresponding to the external region within the reference picture; and predicting the current block based on the acquired reference samples.

9 Claims, 13 Drawing Sheets

(56) References Cited

U.S. PATENT DOCUMENTS

| | | | |
|---|---|---|---|
| 2017/0085917 A1 | 3/2017 | Hannuksela | |
| 2017/0374364 A1 | 12/2017 | Lin et al. | |
| 2018/0124312 A1 | 5/2018 | Chang et al. | |
| 2019/0197661 A1 | 6/2019 | Choi et al. | |
| 2019/0222862 A1 | 7/2019 | Shin et al. | |
| 2019/0236990 A1 | 8/2019 | Song et al. | |
| 2019/0260990 A1 | 8/2019 | Lim et al. | |
| 2020/0120359 A1 | 4/2020 | Hanhart et al. | |
| 2022/0353510 A1* | 11/2022 | Lim | H04N 19/176 |
| 2022/0353511 A1* | 11/2022 | Lim | H04N 19/513 |
| 2022/0360791 A1* | 11/2022 | Lim | H04N 19/597 |

FOREIGN PATENT DOCUMENTS

| | | |
|---|---|---|
| KR | 10-2018-0000279 A | 1/2018 |
| KR | 10-2018-0029315 A | 3/2018 |
| KR | 10-2018-0042098 A | 4/2018 |
| KR | 10-2018-0045049 A | 5/2018 |
| WO | 2017/142355 A1 | 8/2017 |
| WO | 2017/220012 A1 | 12/2017 |
| WO | 2018/066988 A1 | 4/2018 |

OTHER PUBLICATIONS

Chinese Office Action dated Jul. 1, 2023 for corresponding Chinese Patent Application No. 201980047008.4, 17 pages.

* cited by examiner

INTER-PREDICTION METHOD AND IMAGE DECODING DEVICE

CROSS-REFERENCE TO RELATED APPLICATION

This present application is a continuation of U.S. patent application Ser. No. 17/251,315, filed on Dec. 11, 2020, which is a national stage filing under 35 U.S.C § 371 of PCT application number PCT/KR2019/006796 filed on Jun. 5, 2019 which is based upon and claims the benefit of priorities to Korean Patent Application No. 10-2018-0066694, filed on Jun. 11, 2018, Korean Patent Application No. 10-2018-0142487, filed on Nov. 19, 2018, and Korean Patent Application No. 10-2019-0065415, filed on Jun. 3, 2019, in the Korean Intellectual Property Office, which are incorporated herein in their entireties by reference.

TECHNICAL FIELD

The present disclosure relates to encoding and decoding of a video, and to an inter prediction method and a video decoding apparatus with improved encoding and decoding efficiency.

BACKGROUND

Since the volume of video data is larger than that of voice data or still image data, storing or transmitting video data without processing for compression requires a lot of hardware resources including memory.

Accordingly, in storing or transmitting video data, the video data is generally compressed using an encoder so as to be stored or transmitted. Then, a decoder receives the compressed video data, and decompresses and reproduces the video data. Compression techniques for such video include H.264/AVC and High Efficiency Video Coding (HEVC), which improves coding efficiency over H.264/AVC by about 40%.

However, since the size, resolution, and frame rate of video are gradually increasing, and thus the amount of data to be encoded is also increasing. Accordingly, a new compression technique having better encoding efficiency and higher quality than the existing compression technique is required.

SUMMARY

Technical Problem

An object of the present disclosure devised to meet such needs is to provide an improved video encoding and decoding technology. In particular, an aspect of the present disclosure relates to technology for reducing the number of bits required to express motion information to improve encoding and decoding.

Technical Solution

In accordance with one aspect of the present disclosure, provided is a method for inter-prediction performed by a video decoding apparatus, the method including deriving a motion vector of a current block based on motion information decoded from a bitstream; acquiring reference samples of a first reference block by using the motion vector, wherein reference samples of an external region located outside a reference picture among the first reference block are acquired from a corresponding region corresponding to the external region within the reference picture; and predicting the current block based on the acquired reference samples.

In accordance with another aspect of the present disclosure, provided is a video decoding apparatus including a motion deriver configured to derive a motion vector of a current block based on motion information decoded from a bitstream; a sample acquirer configured to acquire reference samples of a first reference block by using the motion vector, wherein reference samples of an external region located outside a reference picture among the first reference block are acquired from a corresponding region corresponding to the external region within the reference picture; and a prediction executor configured to predict the current block based on the acquired reference samples.

As is apparent from the foregoing description, according to an embodiment of the present disclosure, a specific region outside a reference picture may be replaced with another region within the reference picture, and accordingly motion information about a 360-degree image may be efficiently estimated.

In addition, according to another embodiment of the present disclosure, the other region in the reference picture corresponds to the same region as the specific region outside the reference picture, and accordingly accuracy of prediction may be improved.

DETAILED DESCRIPTION

Figure 1:
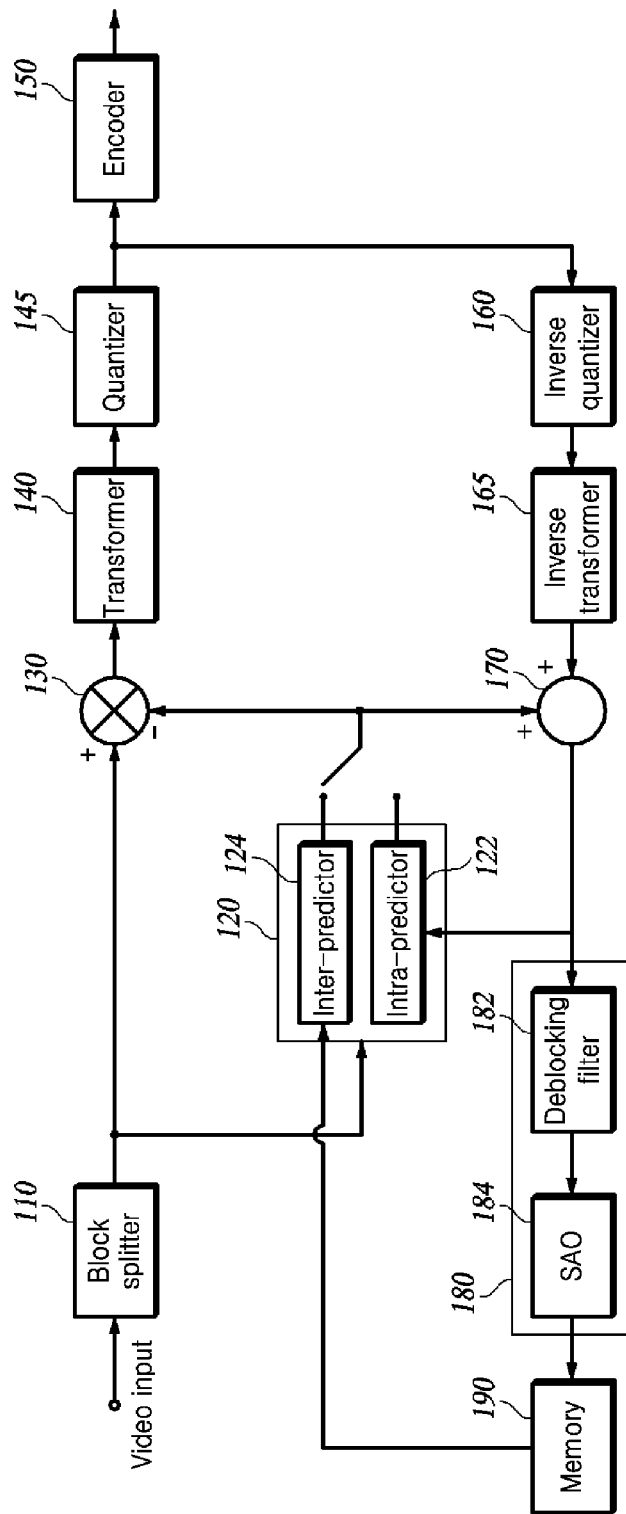
FIG. 1 is an exemplary block diagram of an video encoding apparatus capable of implementing the techniques of the present disclosure.

Hereinafter, some embodiments of the present disclosure will be described in detail with reference to the accompanying drawings. It should be noted that, in adding reference numerals to the constituent elements in the respective drawings, like reference numerals designate like elements, although the elements are shown in different drawings. Further, in the following description of the present disclosure, a detailed description of known functions and configurations incorporated herein will be omitted to avoid obscuring the subject matter of the present disclosure.

FIG. 1 is an exemplary block diagram of an video encoding apparatus capable of implementing the techniques of the present disclosure. Hereinafter, an video encoding apparatus and elements of the apparatus will be described with reference to FIG. 1.

The video encoding apparatus includes a block splitter 110, a predictor 120, a subtractor 130, a transformer 140, a quantizer 145, an encoder 150, an inverse quantizer 160, an inverse transformer 165, an adder 170, a filter unit 180, and a memory 190.

Each element of the video encoding apparatus may be implemented in hardware or software, or a combination of hardware and software. The functions of the respective elements may be implemented in software, and a microprocessor may be implemented to execute the software functions corresponding to the respective elements.

One video is composed of a plurality of pictures. Each picture is split into a plurality of regions, and encoding is performed on each region. For example, one picture is split into one or more tiles and/or slices. Here, the one or more tiles may be defined as a tile group. Each tile or slice is split into one or more coding tree units (CTUs). Each CTU is split into one or more coding units (CUs) by a tree structure. Information applied to each CU is encoded as a syntax of the CU, and information applied to CUs included in one CTU in common is encoded as a syntax of the CTU. In addition, information applied to all blocks in one tile in common is encoded as a syntax of the tile or encoded as a syntax of a tile group, which is a collection of multiple tiles, and information applied to all blocks constituting one picture is encoded in a picture parameter set (PPS) or a picture header. Further, information referred to by a plurality of pictures in common is encoded in a sequence parameter set (SPS). In addition, information referred to by one or more SPSs in common is encoded in a video parameter set (VPS).

The block splitter 110 determines the size of a coding tree unit (CTU). Information about the size of the CTU (CTU size) is encoded as a syntax of the SPS or PPS and is transmitted to the video decoding apparatus.

The block splitter 110 splits each picture constituting a video into a plurality of CTUs having a predetermined size, and then recursively splits the CTUs using a tree structure. In the tree structure, a leaf node serves as a coding unit (CU), which is a basic unit of coding.

The tree structure may be a QuadTree (QT), in which a node (or parent node) is split into four sub-nodes (or child nodes) having the same size, a BinaryTree (BT), in which a node is split into two sub-nodes, a TernaryTree (TT), in which a node is split into three sub-nodes at a ratio of 1:2:1, or a structure formed by a combination of two or more of the QT structure, the BT structure, and the TT structure. For example, a QTBT (QuadTree plus BinaryTree) structure or a QTBTTT (QuadTree plus BinaryTree TernaryTree) structure may be used. Here, BTTTs may be collectively referred to as a multiple-type tree (MTT).

Figure 2:
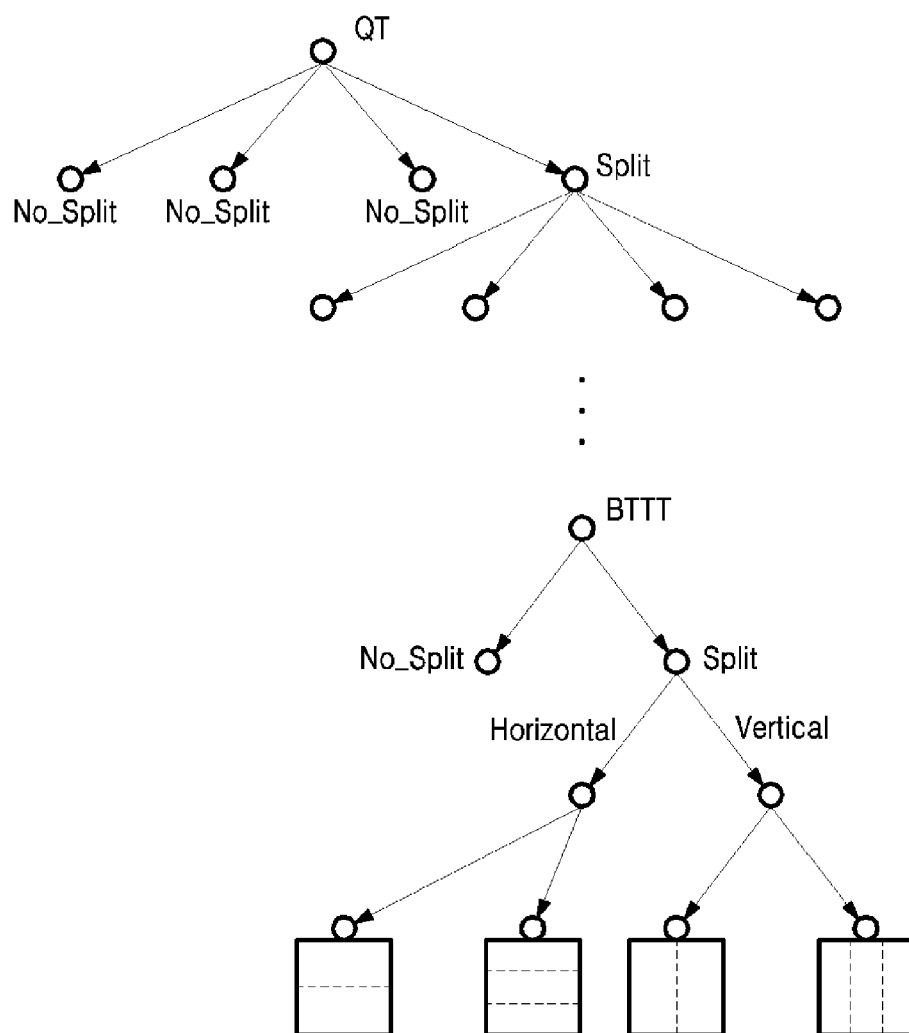
FIG. 2 is a diagram illustrating block splitting using a QTBTTT structure.

FIG. 2 shows a QTBTTT splitting tree structure. As shown in FIG. 2, a CTU may be initially split in the QT structure. The QT splitting may be repeated until the size of the splitting block reaches the minimum block size (MinQTSize) of a leaf node allowed in the QT. A first flag (QT_split_flag) indicating whether each node of the QT structure is split into four nodes of a lower layer is encoded and signaled to the video decoding apparatus by the encoder 150. When the leaf node of the QT is not larger than the maximum block size (MaxBTSize) of the root node allowed in BT, it may be further split in one or more of the BT structure or the TT structure. In the BT structure and/or the TT structure, there may be a plurality of splitting directions. For example, there may be two directions, which are horizontal splitting and vertical splitting of the block of the node. As shown in FIG. 2, when MTT splitting starts, a second flag (mtt_split_flag) indicating whether nodes are split, and a flag indicating a splitting direction (vertical or horizontal), and/or a flag indicating a splitting type (Binary or Ternary) are encoded and signaled to the video decoding apparatus by the encoder 150.

As another example of the tree structure, when a block is split using the QTBTTT structure, information about a CU split flag (split_cu_flag) indicating that the block has been split and a QT split flag (split_qt_flag) indicating whether the splitting type is QT splitting is encoded and signaled to the video decoding apparatus by the encoder 150. When the value of split_cu_flag indicates that the block has not been split, the block of the node becomes a leaf node in the splitting tree structure and is used as a coding unit (CU), which is a basic unit of encoding. When the value of split_cu_flag indicates that the block has not been split, whether the splitting type is QT or MTT is distinguished by the value of split_qt_flag. When the splitting type is QT, there is no additional information. When the splitting type is MTT, a flag (mtt_split_cu_vertical_flag) indicating the MTT splitting direction (vertical or horizontal) and/or a flag (mtt_split_cu_binary_flag) indicating the MTT splitting type (Binary or Ternary) are encoded and signaled to the video decoding apparatus by the encoder 150.

As another example of the tree structure, when QTBT is used, there may be two splitting types, which are horizontal splitting (i.e., symmetric horizontal splitting) and vertical splitting (i.e., symmetric vertical splitting) of a block of a node into two blocks of the same size. A split flag (split_flag) indicating whether each node of the BT structure is split into blocks of a lower layer and split type information indicating the splitting type are encoded and transmitted to the video decoding apparatus by the encoder 150. There may be an additional type, which is splitting a block of a node into two asymmetric blocks. The asymmetric splitting type may include a type of splitting a block into two rectangular blocks at a size ratio of 1:3, and a type of diagonally splitting a block of a node.

CUs may have various sizes according to QTBT or QTBTTT splitting of a CTU. Hereinafter, a block corresponding to a CU (i.e., a leaf node of QTBTTT) to be encoded or decoded is referred to as a "current block."

The predictor 120 predicts a current block to generate a predicted block. The predictor 120 includes an intra-predictor 122 and an inter-predictor 124.

In general, each of the current blocks in a picture may be predictively coded. Prediction of a current block may be performed using the technique of intra-prediction (which is performed based on the data from a picture containing the current block) or the technique of inter-prediction (which is performed based on the data from a picture coded before the picture containing the current block). Inter-prediction includes both uni-directional prediction and bi-directional prediction.

Figure 3:
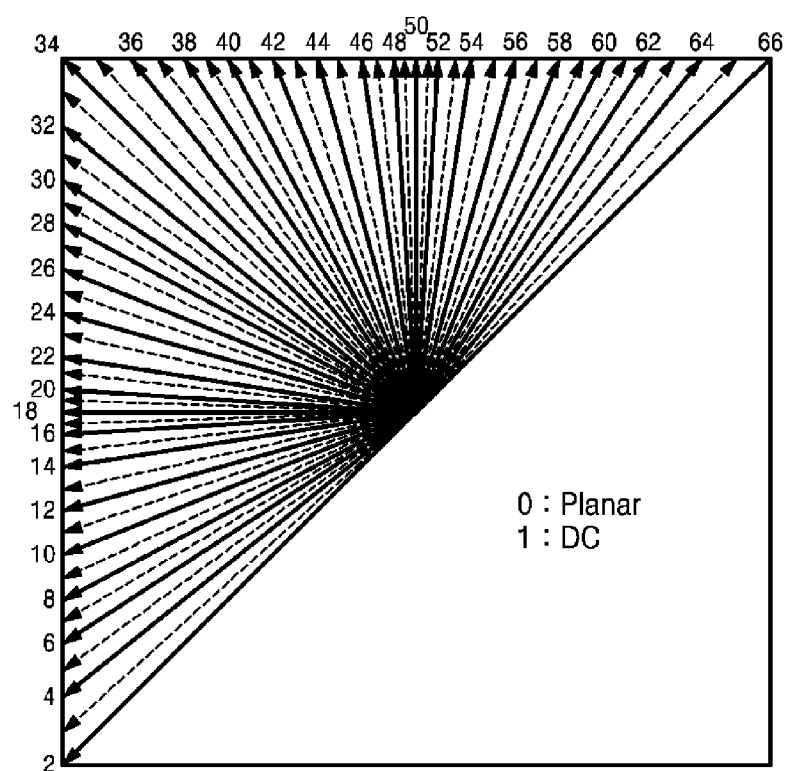
FIG. 3 is a diagram illustrating a plurality of intra-prediction modes.

The intra-predictor 122 predicts pixels in the current block using pixels (reference pixels) located around the current block in the current picture including the current block. There is a plurality of intra-prediction modes according to the prediction directions. For example, as shown in FIG. 3, the plurality of intra-prediction modes may include non-directional modes, which include a planar mode and a DC mode, and 65 directional modes. Neighboring pixels and an equation to be used are defined differently for each prediction mode.

The intra-predictor 122 may determine an intra-prediction mode to be used in encoding the current block. In some examples, the intra-predictor 122 may encode the current block using several intra-prediction modes and select an appropriate intra-prediction mode to use from the tested modes. For example, the intra-predictor 122 may calculate rate distortion values using rate-distortion analysis of several tested intra-prediction modes, and may select an intra-prediction mode that has the best rate distortion characteristics among the tested modes.

The intra-predictor 122 selects one intra-prediction mode from among the plurality of intra-prediction modes, and predicts the current block using neighboring pixels (reference pixel) and an equation determined according to the selected intra-prediction mode. Information about the selected intra-prediction mode is encoded by the encoder 150 and transmitted to the video decoding apparatus.

The inter-predictor 124 generates a predicted block for the current block through a motion compensation process. The inter-predictor searches for a block most similar to the current block in a reference picture encoded and decoded earlier than the current picture, and generates a predicted block for the current block based on the searched block. Then, the inter-predictor generates a motion vector corresponding to a displacement between the current block in the current picture and the predicted block in the reference picture. In general, motion estimation is performed on a luma component, and a motion vector calculated based on the luma component is used for both the luma component and the chroma component. Motion information including information on the reference picture used to predict the current block and information on the motion vector is encoded and transmitted to the video decoding apparatus by the encoder 150.

The subtractor 130 generates a residual block by subtracting the predicted block generated by the intra-predictor 122 or the inter-predictor 124 from the current block.

The transformer 140 transforms a residual signal in a residual block having pixel values in the spatial domain into a transform coefficient in the frequency domain. The transformer 140 may transform the residual signals in the residual block using the total size of the current block as a transformation unit. Alternatively, the transformer may split the residual block into sub-blocks of a transform region and non-transform region, and transform the residual signals using only the sub-block of the transform region as a transformation unit. Here, the transform region sub-block may be one of two rectangular blocks having a size ratio of 1:1 based on the horizontal axis (or vertical axis). In this case, a flag (cu_sbt_flag) indicating that only the subblock has been transformed, directional (vertical/horizontal) information (cu_sbt_horizontal_flag), and/or location information (cu_sbt_pos_flag) are encoded and signaled to the video decoding apparatus by the encoder 150. In addition, the size of the transform region sub-block may have a size ratio of 1:3 based on the horizontal axis (or vertical axis). In this case, a flag (cu_sbt_quad_flag) for distinguishing the splitting is additionally encoded signaled to the video decoding apparatus by the encoder 150.

The quantizer 145 quantizes transform coefficients output from the transformer 140, and outputs the quantized transform coefficients to the encoder 150.

The encoder 150 generates a bitstream by encoding the quantized transform coefficients using an encoding method such as Context-based Adaptive Binary Arithmetic Code (CABAC). The encoder 150 encodes information such as the CTU size, CU split flag, QT split flag, MTT splitting direction, and MTT splitting type related to block splitting, such that the video decoding apparatus splits the block in the same manner as the video encoding apparatus.

Further, the encoder 150 encodes information about a prediction type indicating whether the current block is encoded by intra-prediction or by inter-prediction, and encodes intra-prediction information (i.e., information about an intra-prediction mode) or inter-prediction information (information about a reference picture and a motion vector) according to the prediction type.

The inverse quantizer 160 inversely quantizes the quantized transform coefficients output from the quantizer 145 to generate transform coefficients. The inverse transformer 165 transforms the transform coefficients output from the inverse quantizer 160 from the frequency domain to the spatial domain and reconstructs the residual block.

The adder 170 adds the reconstructed residual block to the predicted block generated by the predictor 120 to reconstruct the current block. The pixels in the reconstructed current block are used as reference pixels for intra-prediction of the next block.

The filter unit 180 filters the reconstructed pixels to reduce blocking artifacts, ringing artifacts, and blurring artifacts generated due to block-based prediction and transformation/quantization. The filter unit 180 may include a deblocking filter 182 and a sample adaptive offset (SAO) filter 184.

The deblocking filter 180 filters the boundary between the reconstructed blocks to remove blocking artifacts caused by block-by-block encoding/decoding, and the SAO filter 184 additionally filters the deblocking filtered video. The SAO filter 184 is a filter used to compensate for a difference between a reconstructed pixel and an original pixel caused by lossy coding.

The reconstructed blocks filtered through the deblocking filter 182 and the SAO filter 184 are stored in the memory 190. Once all blocks in one picture are reconstructed, the reconstructed picture is used as a reference picture for inter-prediction of blocks in the next picture to be encoded.

Figure 4:
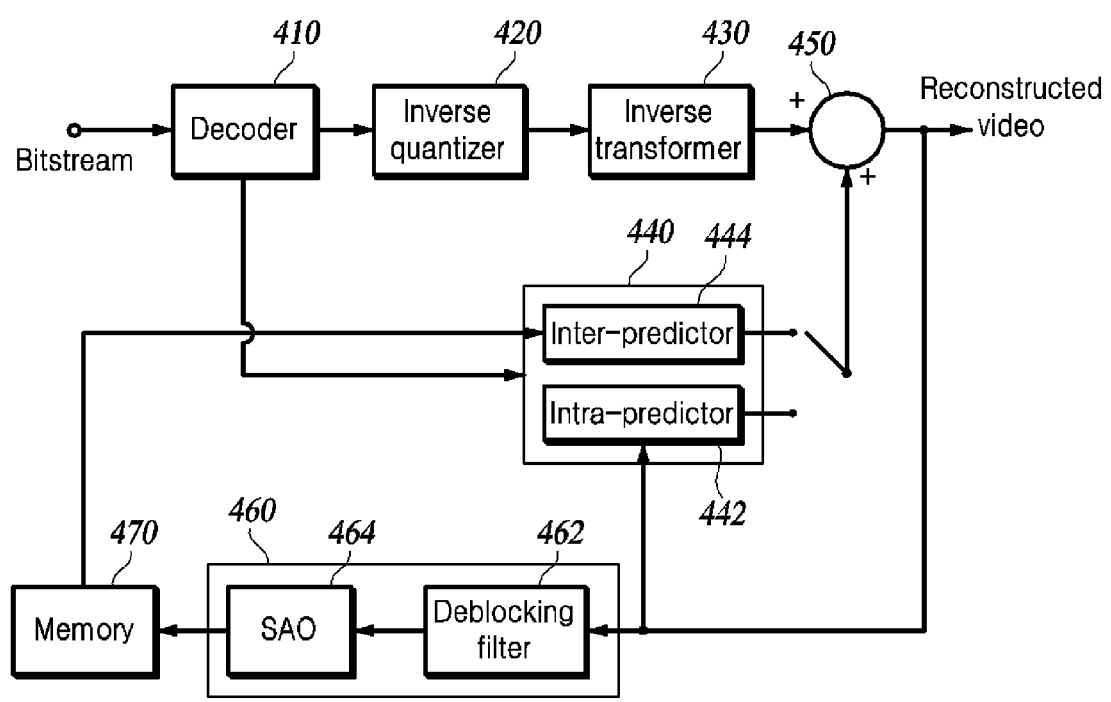
FIG. 4 is an exemplary block diagram of an video decoding apparatus capable of implementing the techniques of the present disclosure.

FIG. 4 is an exemplary functional block diagram of an video decoding apparatus capable of implementing the techniques of the present disclosure. Hereinafter, the video decoding apparatus and elements of the apparatus will be described with reference to FIG. 4.

The video decoding apparatus may include a decoder 410, an inverse quantizer 420, an inverse transformer 430, a predictor 440, an adder 450, a filter unit 460, and a memory 470.

Similar to the video encoding apparatus of FIG. 1, each element of the video decoding apparatus may be implemented as hardware or software, or may be implemented as a combination of hardware and software. In addition, the function of each element may be implemented as software, and a microprocessor may be implemented to execute the functions of software corresponding to each element.

The decoder 410 determines a current block to be decoded by decoding the bitstream received from the video encoding apparatus and extracting information related to block splitting, and extracts prediction information and information on residual signals necessary to reconstruct the current block.

The decoder 410 extracts information about the CTU size from the sequence parameter set (SPS) or the picture parameter set (PPS), determines the size of the CTU, and splits a picture into CTUs of the determined size. Then, the decoder determines the CTU as the uppermost layer, that is, the root node of a tree structure, and extracts splitting information about the CTU to split the CTU using the tree structure.

For example, when the CTU is split using the QTBTTT structure, a first flag (QT_split_flag) related to QT splitting is first extracted and each node is split into four nodes of a lower layer. Then, for a node corresponding to the leaf node of QT, a second flag (MTT_split_flag) related to MTT splitting and information on the splitting direction (vertical/horizontal) and/or splitting type (binary/ternary) are extracted, and the leaf node is split in the MTT structure. In this way, each node below the leaf node of the QT is recursively split in a BT or TT structure.

As another example, when a CTU is split using the QTBTTT structure, a CU split flag (split_cu_flag) indicating whether a CU is split is first extracted. If the corresponding block is split, a QT split flag (split_qt_flag) is extracted. When the splitting type is not QT but MTT, a flag (mtt_split_cu_vertical_flag) indicating the MTT splitting direction (vertical or horizontal) and/or a flag (mtt_split_cu_binary_flag) indicating the MTT splitting type (Binary or Ternary) is additionally extracted. In the splitting process, each node may be subjected to recursive QT splitting zero or more times, and then subjected to recursive MTT splitting zero or more times. For example, the CTU may be MTT-split immediately, or may only be QT-split multiple times.

As another example, when the CTU is split using the QTBT structure, the first flag (QT_split_flag) related to the QT spitting, and each node is split into four nodes of a lower layer. For a node corresponding to the leaf node of the QT, the split_flag indicating whether the node is further BT-split and splitting direction information are extracted.

Upon determining the current block to be decoded through tree structure splitting, the decoder 410 extracts information about a prediction type indicating whether the current block is subjected to intra-prediction or inter-prediction. When the prediction type information indicates intra-prediction, the decoder 410 extracts a syntax element for the intra-prediction information (intra-prediction mode) for the current block. When the prediction type information indicates inter-prediction, the decoder 410 extracts a syntax element for the inter-prediction information, that is, information indicating a motion vector and a reference picture referred to by the motion vector.

The decoder 410 extracts information about quantized transform coefficients of the current block as information about residual signals.

The inverse quantizer 420 inversely quantizes the quantized transform coefficients, and inversely transforms the inversely quantized transform coefficients from the frequency domain to the spatial domain to reconstruct residual signals to generate a residual block for the current block.

In addition, when the inverse transformer 430 inversely transforms only a partial region (sub-block) of a transform block, a flag (cu_sbt_flag) indicating that only a sub-block of the transform block has been transformed, and the direction information (vertical/horizontal) about the sub-block (cu_sbt_horizontal_flag) and/or sub-block location information (cu_sbt_pos_flag) are extracted. Then, residual signals are reconstructed by inversely transforming the transform coefficients of the sub-block from the frequency domain to the spatial domain. For the region that is not inversely transformed, the residual signal is filled with "0". Thereby, the final residual block for the current block is created.

The predictor 440 may include an intra-predictor 442 and an inter-predictor 444. The intra-predictor 442 is activated when the prediction type of the current block is intra-prediction, and the inter-predictor 444 is activated when the prediction type of the current block is inter-prediction.

The intra-predictor 442 determines an intra-prediction mode of the current block among a plurality of intra-prediction modes based on a syntax element for the intra-prediction mode extracted from the decoder 410, and predicts the current block based on the reference pixels around the current block according to the intra-prediction mode.

The inter-predictor 444 determines a motion vector of the current block and a reference picture referenced by the motion vector based on the syntax element for the inter-prediction mode extracted from the decoder 410, and predicts the current block based on the motion vector and the reference picture.

The adder 450 reconstructs the current block by adding the residual block output from the inverse transformer and the predicted block output from the inter-predictor or the intra-predictor. The pixels in the reconstructed current block are used as reference pixels for intra-prediction of a block to be decoded later.

The filter unit 460 may include a deblocking filter 462 and an SAO filter 464. The deblocking filter 462 performs deblocking filtering on the boundary between reconstructed blocks to remove blocking artifacts caused by block-by-block decoding. The SAO filter 464 performs additional filtering on a reconstructed block after deblocking filtering in order to compensate for a difference between the reconstructed pixel and the original pixel caused by lossy coding. The reconstructed block filtered through the deblocking filter 462 and the SAO filter 464 is stored in the memory 470. When all blocks in one picture are reconstructed, the reconstructed picture is used as a reference picture for inter-prediction of a block in a picture to be encoded thereafter.

Figure 5:
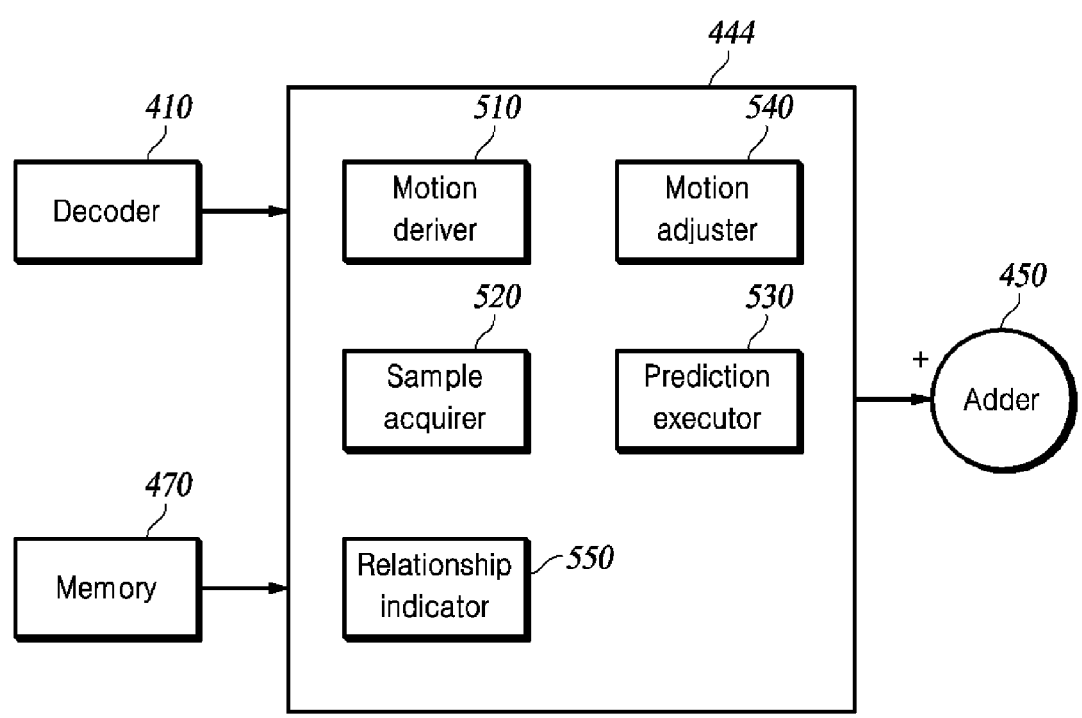
FIG. 5 is an exemplary block diagram of an inter-predictor capable of implementing the techniques of the present disclosure.
Figure 6:
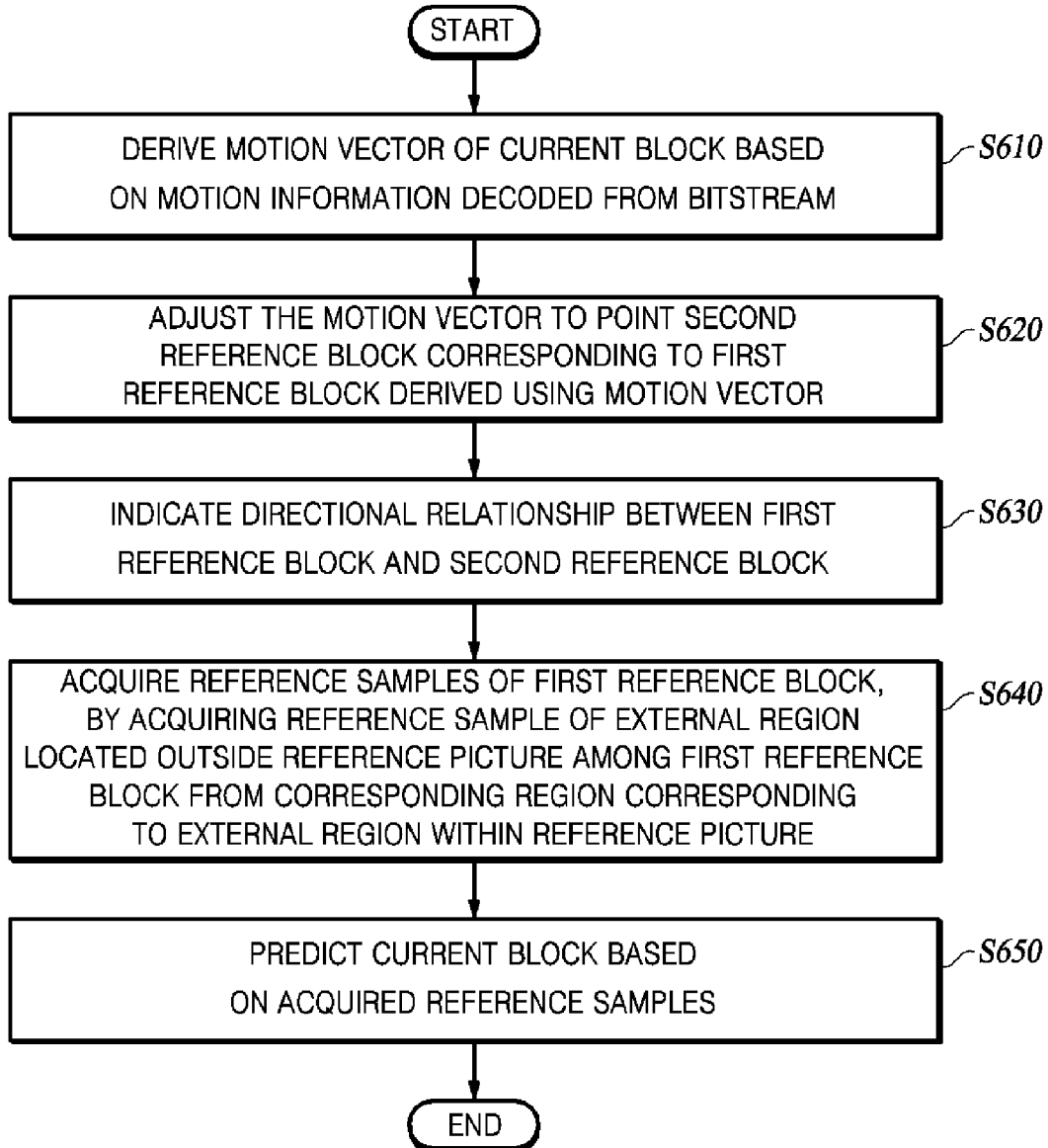
FIG. 6 is a flowchart illustrating an example of the present disclosure related to prediction of a current block.
Figure 7:
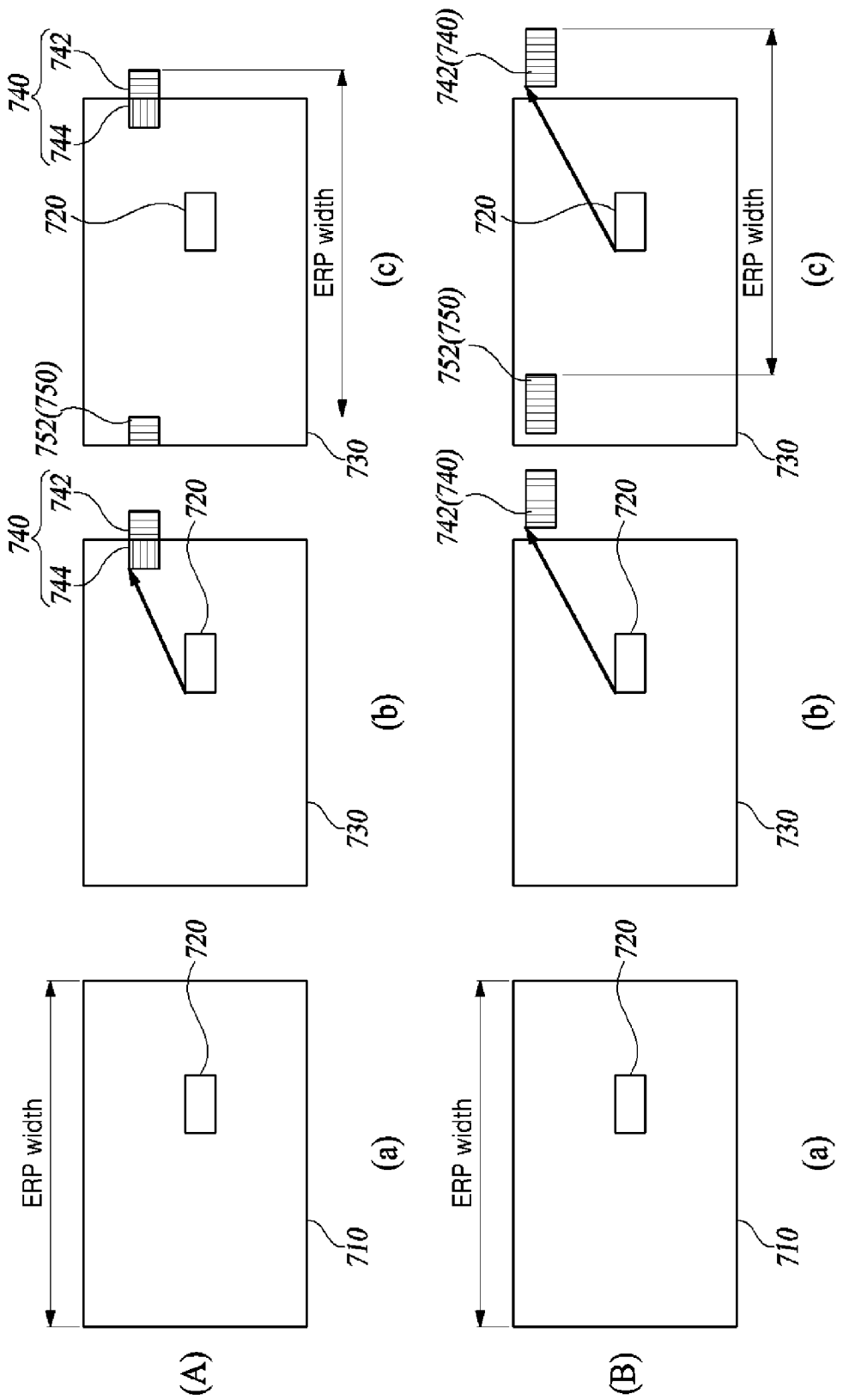
FIG. 7 is a diagram illustrating an example of the present disclosure related to prediction of a current block.

FIG. 5 is an exemplary block diagram of the inter-predictor 444 capable of implementing the techniques of the present disclosure, FIG. 6 is a flowchart illustrating a method of predicting a current block by the inter-predictor 444, and FIG. 7 is a diagram illustrating an example of the present disclosure in which the inter-predictor 444 predicts a current block. Hereinafter, technical features of the present disclosure that more accurately and efficiently implement prediction of a current block for a 360-degree image will be described in detail with reference to FIGS. 5 to 7.

The inter-screen prediction encoding method (inter-prediction method) may include a skip mode, a merge mode, and an adaptive (or advanced) motion vector predictor (AMVP) mode. In the skip mode, only the motion information of one of the motion information candidates of a neighboring block is signaled. In the merge mode, the motion information of one of the motion information candidates of the neighboring block and information obtained by encoding a residual after prediction are signaled. In the AMVP mode, the motion information on the current block and information obtained by encoding the residual after prediction are signaled.

The motion information in the skip mode and the merge mode may correspond to an index value indicating one of the candidates. In the standard HEVC, the index value may be expressed through the merge_idx syntax. The motion information in the AMVP mode may correspond to a difference (my difference (MVD)) between the motion information about the neighboring block and the motion information about the current block. In the standard HEVC, the value of the MVD may be expressed through various syntaxes as shown in Table 1 below.

TABLE 1

| | Descriptor |
|---|---|
| mvd_coding( x0, y0. refList ) { | |
|   abs_mvd_greater0_flag[ 0 ] | ae(v) |
|   abs_mvd_greater0_flag[ 1 ] | ae(v) |
|   if( abs_mvd_greater0_flag[ 0 ] ) | |
|     abs_mvd_greater1_flag[ 0 ] | ae(v) |
|   if( abs_mvd_greater0_flag[ 1 ] ) | |
|     abs_mvd_greater1_flag[ 1 ] | ae(v) |
|   if( abs_mvd_greater0_flag[ 0 ] ) { | |
|     if( abs_mvd_greater1_flag[ 0 ] | |
| ) | |
|       abs_mvd_minus2[ 0 ] | ae(v) |
|     mvd_sign_flag[ 0 ] | ae(v) |
|   } | |
|   if( abs_mvd_greater0_flag[ 1 ] ) { | |
|     if(abs_mvd_greater1_flag[ 1 ] ) | |
|       abs_mvd_minus2[ 1 ] | ae(v) |
|     mvd_sign_flag[ 1 ] | ae(v) |
|   } | |
| } | |

In Table 1 above, [0] denotes the horizontal axis component x, and [1] denotes the vertical axis component y.

In skip mode and merge mode, a motion vector of the current block may be derived through motion information about a neighboring block indicated by a signaled value of merge_idx. In AMVP mode, the motion vector of the current block may be derived by summing a motion vector predictor (MVP) value obtained through the motion information about the neighboring block and the signaled value of MVD.

In the conventional method, when a partial or entire region (hereinafter referred to as an "external region") of the reference block indicated by the motion vector of the current block is located outside a reference picture, reference samples is obtained through a method of padding the samples of the external region with samples that are closest to the external region among the samples at the boundary or outermost region of the reference picture.

For example, in the conventional method, when the sum of the horizontal axis location (x coordinate) of the current block and the horizontal magnitude (x coordinate) of the motion vector deviates from the reference picture, it is replaced with a value at the nearest end of the reference picture. This example is expressed by Equation 1 below.

$$xInt_L = xPb + (mvLX[0] \gg 2) + x_L$$

$$xA_i = Clip3(0, pic\_width\_in\_luma\_samples-1, xInt_L + i) \quad \text{[Equation 1]}$$

In Equation 1 above, xPb denotes the horizontal axis location (x coordinate) of the current block, and mvLX[0] denotes the horizontal magnitude (x coordinate) of a quarter-pixel motion vector. $x_L$ denotes the range from 0 to (width-1), where 'width' corresponds to the width of the current block. $xInt_L$ denotes the location of an integer pixel indicated by a motion vector in a reference picture. Also, $xA_i$ denotes the location of the final integer sample obtained by summing the relative location of the neighboring integer pixel(i) required for the k-tap interpolation filter and $xInt_L$. That is, $xA_i$ denotes the locations of integer pixels arranged along the horizontal axis around $xInt_L$ required for the k-tap interpolation filter. Regarding $xInt_L$, when the motion vector value mvLX[0] is quarter(¼)-pixel, an operation (mvLX[0]≫2) corresponding to 4 times the motion vector value as expressed in Equation 1 may be performed. When mvLX[0] is ¹⁄₁₆-pixel, an operation (mvLX[0]≫4) corresponding to 16 times the motion vector value may be performed.

As presented in Equation 1, when the location of $xInt_L + i$ is outside the reference picture, the value of $xA_i$ is replaced with the value of the left or right end location in the reference picture using a clipping function.

As another example, in the conventional method, when the sum of the location of the current block (y coordinate) on the vertical axis and the magnitude of the motion vector along the vertical axis (y coordinate) deviates from the reference picture, it is replaced with the value of the nearest end in the reference picture. This example is represented by Equation 2 below.

$$yInt_L = yPb + (mvLX[1] \gg 2) + y_L$$

$$yA_i = Clip3(0, pic\_height\_in\_luma\_samples-1, yInt_L + i) \quad \text{[Equation 2]}$$

In Equation 2 above, yPb denotes the vertical axis location (y coordinate) of the current block, and mvLX[1] denotes the vertical magnitude (y coordinate) of the quarter-pixel motion vector. $y_L$ denotes the range from 0 to (height-1), where 'height' corresponds to the height of the current block. $yInt_L$ denotes the location of an integer pixel indicated by a motion vector in the reference picture. Also, $yA_i$ denotes the location of the final integer sample obtained by summing the relative location of the neighboring integer pixel(i) required for the k-tap interpolation filter and $yInt_L$. That is, $yInt_L$ denotes the locations of integer pixels arranged along a vertical axis around $yInt_L$ required for the k-tap interpolation filter. Regarding $yInt_L$, when the motion vector value mvLX[1] is quarter(¼)-pixel, an operation (mvLX[1]≫2) corresponding to 4 times the motion vector value may be performed as expressed in Equation 2. When mvLX[1] is ¹⁄₁₆-pixel, an operation (mvLX[1]≫4) corresponding to 16 times the motion vector value may be performed. [81] As expressed in Equation 2, when the location of $yInt_L + i$ deviates from the reference picture, the value of $yA_i$ is replaced with the value of the upper or lower end location in the reference picture using the clipping function.

This conventional method operated as described above requires additional memory resources extending the region of the reference picture to an external region, and approximate samples of the external region based on samples located at the outermost side of the reference picture. Accordingly, it may lower the accuracy of motion compensation.

Boundaries of a 360-degree image projected onto a 2D image may be in contact with each other (connected to each other) based on a 3D structure of the 360-degree image. For example, the left and right sides of a 360-degree image projected onto a 2D image are in contact with each other in the 3D structure, the upper left side and the upper right side are in contact with each based on the center vertical line, and the lower left side and the lower right side are in contact with each other based on the center vertical line. The present disclosure proposes a more efficient inter-prediction method for an external region located outside the reference picture, based on such characteristics of a 360-degree image.

The current picture and the reference picture mentioned in the present disclosure may be pictures obtained by transforming a 360-degree image of a 3D structure into various types of 2D formats such as Equirectangular Projection (ERP), Cube Map Projection (CMP), and Icosahedral Projection (ISP). Hereinafter, the present disclosure will be described centering on a current picture and a reference picture obtained by transforming a 3D-structured 360-degree image into a 2D format ERP.

The video encoding apparatus searches for a first reference block that is a reference block corresponding to a current block to be encoded. Here, the first reference block may be a block most similar to the current block. In addition, the video encoding apparatus may acquire reference samples from the first reference block in order to predict the current block. Reference samples of an external region of the first reference block, which is located outside the reference picture, may be acquired from a corresponding region corresponding to the external region. The corresponding region may be located in the reference picture. Further, the video encoding apparatus may predict the current block based on the acquired reference samples.

Each of the first reference block, the external region, and the corresponding region described in relation to the video encoding apparatus may have the same meaning as each of a first reference block 740, an external region 742, and a corresponding region 752, which will be described below in relation the video decoding apparatus. Operations described below as being performed by the video decoding apparatus may be similarly performed by the video encoding apparatus.

As shown in FIG. 5, the inter-predictor 444 may include a motion deriver 510, a sample acquirer 520, a prediction executor 530, a motion adjuster 540, and a relationship indicator 550.

First, regarding the current block 720 included in the current picture 710 to be decoded, the motion deriver 510 derives a motion vector of the current block 720 based on motion information (decoded from the bitstream) transmitted from the video encoding apparatus (S610).

In the case of the skip mode or the merge mode, the motion deriver 510 may derive the motion vector of the current block 720 (indicated by a solid arrow in FIG. 7) based on the value of merge_idx corresponding to an index value for one of the motion information candidates of a neighboring block. In the case of the AMVP mode, the motion deriver 510 may derive the motion vector of the current block 720 by summing the motion vector predictor (MVP) acquired through motion information values of the neighboring blocks and a motion vector difference (MVD) decoded by the decoder 410 (and transmitted from the video encoding apparatus).

Once the motion vector is derived, the sample acquirer 520 acquires reference samples of a first reference block 740, which is a reference block derived using the derived motion vector (S640). Specifically, when an integer sample obtained through the location of the motion vector and the location/size of the current block 720 deviates from the reference picture, the sample acquirer 520 acquires a corresponding integer sample from an appropriate location in the reference picture (S640). Here, the first reference block 740 includes integer samples.

Regarding the location of the first reference block 740, only a part of the first reference block 740 may be located outside the reference picture 730 (FIG. 7(A)), or the entirety of the first reference block 740 may be located outside the reference picture 730 (FIG. 7(B)).

As shown in (b) and (c) of FIG. 7(A), when only a part of the first reference block 740 is located outside the reference picture 730, the first reference block 740 may be composed of an external region 742 located outside the reference picture 730 and an internal region 744 located inside the reference picture 730. That is, the first reference block 740 may include samples located outside the reference picture 730 and samples located inside the reference picture 730.

In this case, the sample acquirer 520 may be configured to acquire reference samples corresponding to the external region 742 from another region within the reference picture 730, considering that the right boundary of the reference picture 730 contacts the left boundary of the reference picture 730 in the 360-degree image. Specifically, the sample acquirer 520 may acquire reference samples corresponding to the internal region 744 from the internal region 744, and reference samples corresponding to the external region 742 from the corresponding region 752 which is a region corresponding to the external region 742 in the reference picture 730. Here, the correspondence between the external region 742 and the corresponding region 752 may mean that the external region 742 and the corresponding region 752 are the same region from the perspective of the 360-degree image.

The location at which the reference samples are acquired based on the reference picture 730 may be described as follows. The reference samples corresponding to the internal region 744 may be acquired from the right part of the reference picture 730 and the reference samples corresponding to the external region 742 may be acquired from the left part of the reference picture 730.

As shown in (b) and (c) of FIG. 7(B), when the entirety of the first reference block 740 is located outside the reference picture 730, the first reference block 740 may be composed of only the external region 742 located outside the picture 730. That is, the first reference block 740 may be composed of only samples located outside the reference picture 730.

In this case, the sample acquirer 520 may acquire reference samples corresponding to the external region 742 from the corresponding region 752 inside the reference picture 730. Here, the external region 742 and the corresponding region 752 are the same region from the perspective of the 360-degree image.

Figure 8:
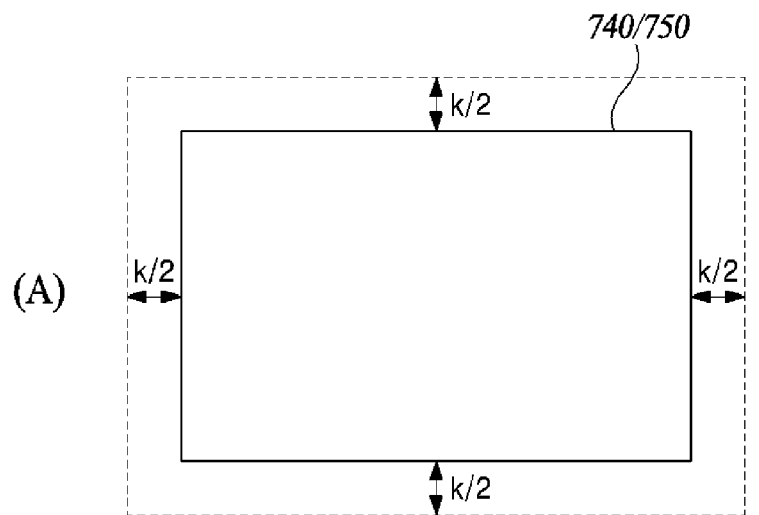
FIG. 8 is a diagram illustrating another example of the present disclosure related to prediction of a current block.
Figure 8:
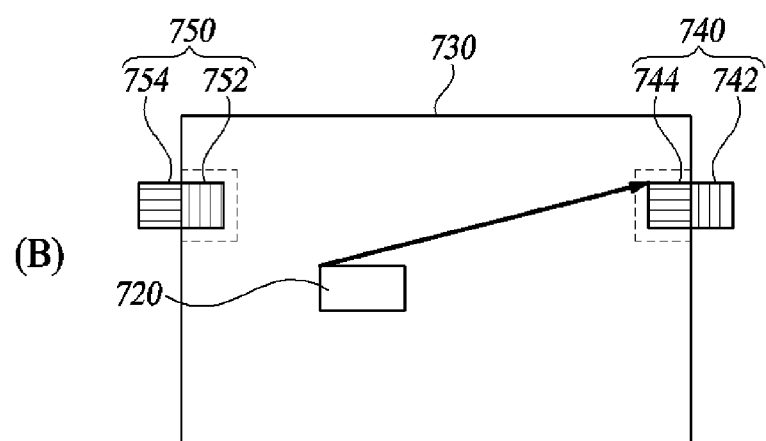

When the present disclosure employs a k-tap interpolation filter (where k is a natural number) for motion compensation, the corresponding region 752 and/or the internal region 744 for which reference samples are acquired may be a region (indicated by a dotted line) formed by expanding the regions represented by a solid line in FIG. 8 by k in the horizontal direction (k/2 to the left and k/2 to the right) and by k in the vertical direction (upward by k/2 and downward by k/2).

In acquiring reference samples from the internal region 744, the sample acquirer 520 may acquire the reference samples in the region formed by expanding the internal region 744 shown in FIG. 8 leftward, upward, and downward by k/2, respectively. In acquiring reference samples from the corresponding region 752, the sample acquirer 520 may acquire the reference samples in the region formed by expanding the corresponding region 752 shown in FIG. 8 rightward, upward, and downward by k/2, respectively.

Whether to expand the internal region 744 and the corresponding region 752 may be determined through resolution of a motion vector. For example, when the fractional part of the motion vector is 0, the internal region 744 and the corresponding region 752 may not be expanded. When the fractional part of the motion vector is not 0, the internal region 744 and the corresponding region 752 may be expanded.

The following description of acquiring reference samples from the internal region 744 or the corresponding region 752 should be understood as including both acquiring the reference samples from the internal region 744 or the corresponding region 752, and acquiring the reference samples from a region formed by expanding the internal region 744 or the corresponding region 752 by k.

The corresponding region 752 may be searched for by shifting the first reference block 740 to the left or right by the ERP width or the width of the reference picture 730, and selecting a region (corresponding region) that belongs to a reference block 750 (hereinafter referred to as a "second reference block") at the shifted location and is located inside the reference picture 730. This operation is represented by Equation 3 below.

$$xInt_L = xPb + (mvLX[0] \gg 4) + x_L \quad \text{[Equation 3]}$$
$$\text{if } (xInt_L + i < 0)$$
$$xA_i = picWidth + (xInt_L + i)$$
$$\text{else if } (xInt_L + i > picWidth - 1)$$
$$xA_i = (xInt_L + i) - picWidth$$
$$\text{else}$$
$$xA_i = xInt_L + i$$

In Equation 3 above, xPb denotes the horizontal axis location (x coordinate) of the current block 720, and mvLX[0] denotes the horizontal magnitude (x coordinate) of a sub-pixel motion vector. $x_L$ denotes the range from 0 to (width-1), where 'width' corresponds to the width of the current block 720. $xInt_L$ denotes the location of an integer pixel indicated by a motion vector in a reference picture 730, and picWidth may have various meanings such as the width of the reference picture 730, the width of the unpadded ERP, the width of the padded ERP, and an offset. Also, $xA_i$ denotes the location of the final integer sample obtained by summing the relative location of the neighboring integer pixel(i) required for the k-tap interpolation filter and $xInt_L$. That is, $xA_i$ denotes the locations of integer pixels arranged along the horizontal axis around $xInt_L$ required for the k-tap interpolation filter. Regarding $xInt_L$, when the motion vector value mvLX[0] is quarter(¼)-pixel, an operation (mvLX[0]»2) corresponding to 4 times the motion vector value may be performed. When mvLX[0] is ¹⁄₁₆-pixel, an operation (mvLX[0]»4) corresponding to 16 times the motion vector value as expressed in Equation 3 may be performed.

As expressed in Equation 3, when the integer sample indicated by the motion vector is located outside the left side of the reference picture 730 ($xInt_L+i<0$), the corresponding final integer sample $xA_i$ may be selected by adding picWidth to the horizontal axis coordinate of the integer sample. When the integer sample indicated by the motion vector is located outside the right side of the reference picture 730 ($xInt_L+i>picWidth-1$), the corresponding final integer sample $xA_i$ may be selected by subtracting picWidth from the horizontal axis coordinate of the integer sample.

Generally, picWidth may be equal to the width of the reference picture 730, the width of the reconstructed picture, or the width of a picture to be decoded. However, when coding is performed by padding a certain region α to the width w of the original ERP picture, picWidth may be equal to the width w of the original ERP picture (the unpadded reference picture), and the width of a picture to be decoded, the width of a reconstructed picture, and the width of the reference picture 730 may be equal to (w+α). Here, a denotes the width of the padded region.

In this case, the corresponding region 752 may be searched for by shifting the first reference block 740 to the left by w, not the width (w+α) of the padded reference picture 730 and selecting a region (corresponding region) that belongs to the second reference block 750 at the shifted location and is located inside the reference picture 730.

In brief, when the original picture is not padded, the width for search for the corresponding region 752 may be the width w of the original picture or the width of the reference picture 730. When the original picture is padded, the width for search may be the width w of the original picture. Consequently, in both the case where the original picture is padded and the case where the original picture is not padded, the width for search for the corresponding region 752 may be equal to as the width w of the original picture.

picWidth may represent an offset. The offset is a value used to determine (calculate) the location of the corresponding region 752 and may be identified or indicated by information (offset information) signaled from the video encoding apparatus. The offset may be equal to the width w of the original picture or the width of the reference picture 730.

The video decoding apparatus may acquire width w information or offset information about the original picture from the bitstream, and induce or derive the width w or offset of the original picture based on the width w information or offset information about the original picture. Thereafter, the apparatus may shift the external region 742 (reference samples in the external region) by the derived width w or offset of the original picture to identify the corresponding region 752 (reference samples of the corresponding region).

Once reference samples of the first reference block 740 are acquired from the corresponding region 752 and/or the internal region 744, the prediction executor 530 may predict the current block 720 based on the acquired reference samples (a predicted block for the current block may be generated) (S650).

As described above, the present disclosure is configured to acquire reference samples of the external region 742 from the same region (corresponding region) as the external region 742, rather than approximating the external region 742, and therefore the accuracy of prediction of the current block 720 may be improved.

Figure 9:
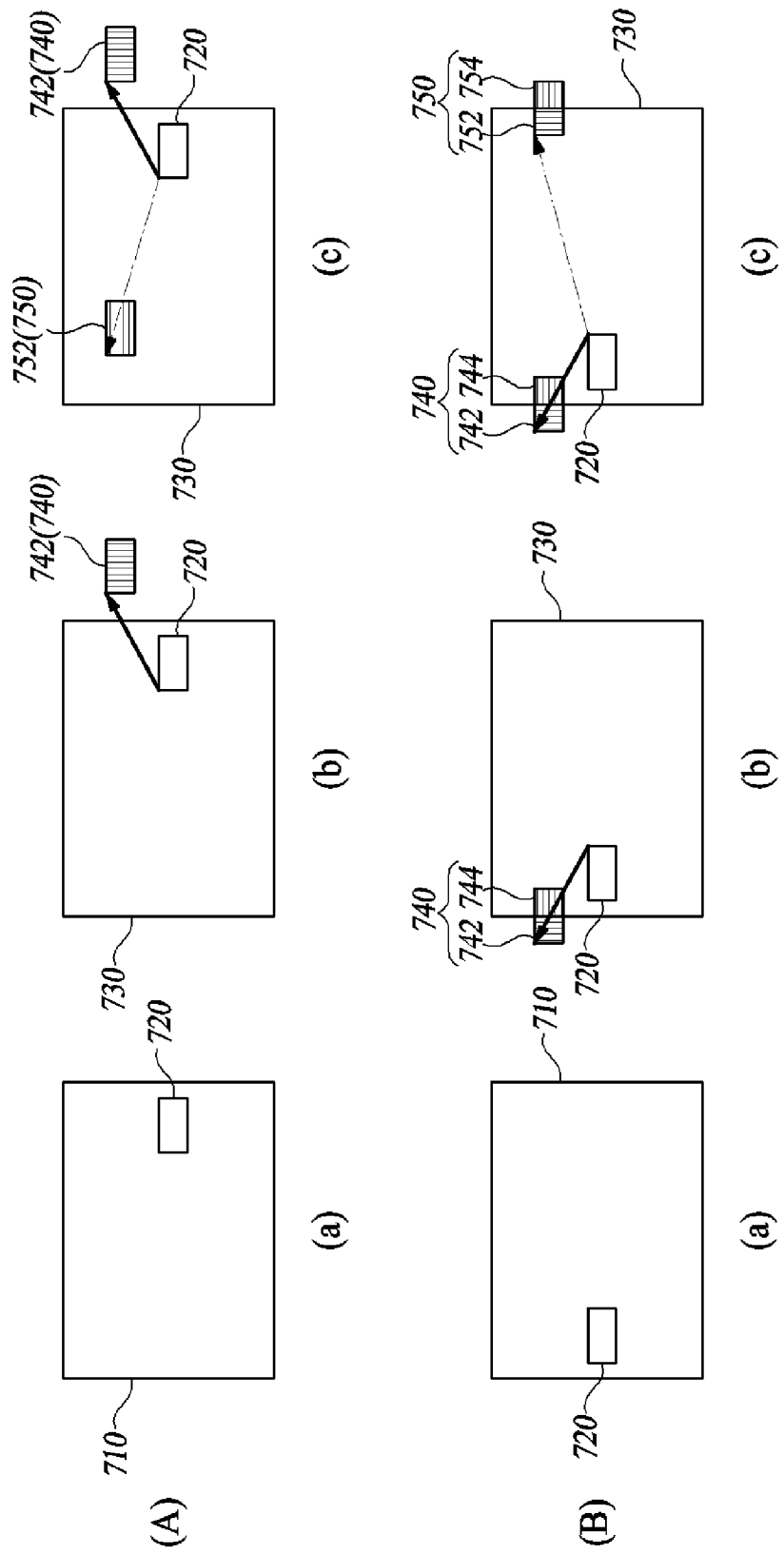
FIG. 9 is a diagram illustrating an embodiment of the present disclosure related to adjustment of a motion vector.

FIG. 9 is a diagram illustrating an embodiment of the present disclosure related to adjustment of a motion vector. Hereinafter, a description will be given of technical features of the present disclosure capable of more efficiently implementing a search for the corresponding region 752 by adjusting a motion vector.

As shown in FIG. 9(A), when the motion vector of the current block 720 points the outside of the right side of the reference picture 730, the entire region of the first reference block 740 derived using the motion vector is located outside the reference picture 730. That is, when the motion vector points the outside of the right side of the reference picture 730, the first reference block 740 is composed of only the external region 742 without the internal region 744.

The inter-predictor 444 may be configured to further perform a procedure of adjusting the motion vector (MV wrapping) such that the motion vector points an appropriate location inside the reference picture 730 (S620). The MV wrapping procedure may be performed by the motion adjuster 540, which is an element included in the inter-predictor 444. In this case, the resolution of the reference picture 730 may be the same as the resolution of the reconstructed picture or as the resolution of the reconstructed picture including a certain padding region.

An example of the MV wrapping procedure is expressed as Equation 4 below.

if(($xPb$+($mvLX$[0]»4)<0)

$uLX$[0]=picWidth+($mvLX$[0]»4)

$mvLX$[0]=$uLX$[0]

else if($xPb$+($mvLX$[0]»4)>picWidth−1)

$uLX$[0]=($mvLX$[0]»4)−picWidth $mvLX$[0]=$uLX$[0]          [Equation 4]

In Equation 4 above, xPb denotes the horizontal axis location (x coordinate) of the current block 720, and mvLX [0] denotes the horizontal magnitude (x coordinate) of a sub-pixel motion vector. picWidth may have the same meanings as described in Equation 3. Here, when the motion vector value mvLX[0] is quarter(¼)-pixel, an operation (mvLX[0]»2) corresponding to 4 times the motion vector value may be performed. When mvLX[0] is ¹⁄₁₆-pixel, an operation (mvLX[0]»4) corresponding to 16 times the motion vector value as expressed in Equation 4 may be performed.

As expressed in Equation 4, when the motion vector points the outside of the left side of the reference picture 730 (xPb+(mvLX[0]»4)<0), the x coordinate of the motion vector is shifted to the right by picWidth (picWidth+(mvLX[0] »4)) to adjust the motion vector to point the inside of the reference picture 730. When the motion vector points the outside of the right side of the reference picture 730 (xPb+ (mvLX[0]»4)>picWidth−1), the x-coordinate of the motion vector is shifted by picWidth ((mvLX[0])»4)−picWidth) to adjust the motion vector to point the inside of the reference picture 730.

Hereinafter, in order to distinguish between the motion vector used in deriving the first reference block 740 and the motion vector adjusted through the MV wrapping procedure, the motion vector used in deriving the first reference block 740 will be referred to as a "first motion vector" (indicated by a solid arrow in FIG. 9), and the motion vector adjusted through the MV wrapping procedure will be referred to as a "second motion vector" (indicated by a dashed-dotted arrow in FIG. 9).

An outer point (a specific point of the first reference block) that the first motion vector points and an inner point (a specific point of the second reference block) that the second motion vector points are the same point from the perspective of the 360-degree image. In addition, the second reference block 750 pointed by the second motion vector (derived using the second motion vector) is the same region as the first reference block 740 from the perspective of the 360-degree image.

As shown in FIG. 9(A), as the entirety of the first reference block 740 is located outside the reference picture 730 (the first reference block is composed of only an external region), the entirety of the second reference block 750 is located inside the reference picture 730 (the second reference block is composed only of a corresponding region).

The sample acquirer 520 acquires reference samples corresponding to the first reference block 740 from the second reference block 750 (S640). In this way, the inter-predictor 444 may replace the external region 742 located outside the reference picture 730 with the corresponding region 752 corresponding to the same region as the external region 742 in the 360 structure, through the MV wrapping procedure.

According to an embodiment, the video encoding apparatus may directly encode and signal the second motion vector. However, due to the relationship between the magnitudes of the x-axis coordinates of the first motion vector and the second motion vector, a smaller number of bits are required to encode the first motion vector than the second motion vector. Accordingly, it may be more efficient to encode the first motion vector in terms of encoding efficiency of motion vectors.

Therefore, when the motion vector (first motion vector) encoded by the video encoding apparatus points the outside of the reference picture 730, the video decoding apparatus may acquire a motion vector (second motion vector) pointing the inside of the reference picture 730 through the above-described MV wrapping procedure, and also acquire a reference block pointed by the second motion vector, that is, the second reference block 750.

As shown in FIG. 9(B), when the first motion vector points the outside of the left side of the reference picture 730, the entirety or a part of the region of the first reference block 740 derived using the first motion vector is located outside the reference picture 730. That is, when the first motion vector points the outside of the left side of the reference picture 730, the entire of the first reference block 740 may be composed of the external region 742 or may be composed of the internal region 744 and the external region 742 each having an area of a predetermined size.

The motion adjuster 540 may adjust the first motion vector to the second motion vector pointing the inside of the reference picture 730 by performing the above-described MV wrapping procedure (S620).

An external point of the reference picture 730 (a specific point of the first reference block) pointed by the first motion vector and an internal point of the reference picture 730 pointed by the second motion vector (a specific point of the second reference block) are the same point from the perspective of the 360-degree image. In addition, the second reference block 750, which is a reference block derived using the second motion vector, corresponds to the same region as the first reference block 740 from the perspective of the 360-degree image, and the corresponding region 752 is located inside the reference block 750.

When the first reference block 740 is composed of the external region 742 and the internal region 744 each having a specific area (FIG. 9(B)), the second reference block 750 is composed of the corresponding region 752 and the remaining region 754 each having a specific area. Hereinafter, the remaining region 754 constituting the second reference block 750 will be referred to as a non-corresponding region 754.

In this state, the sample acquirer 520 acquires reference samples corresponding to the external region 742 from the corresponding region 752 of the second reference block 750 (S640). In other words, the inter-predictor 444 may replace the external region 742 located outside the reference picture 730 with the corresponding region 752 corresponding to the same region as the external region 742 through the MV wrapping procedure.

Regarding the locations at which reference samples are acquired from the perspective of the reference picture 730, the reference samples corresponding to the internal region 744 may be acquired from the left part of the reference picture 730, and the reference samples corresponding to the external region 742 may be acquired from the right part of the reference picture 730.

When encoding is performed by padding a specific region α to the width w of the original ERP picture, the width of the reference picture 730 is extended to (w+α), not the ERP width w, and accordingly the non-corresponding region 754 of the second reference block 750 may be located inside the reference picture 730, not outside the reference picture. In this case, the sample acquirer 520 may acquire reference samples corresponding to the external region 742 of the first reference block 740 from the corresponding region 752 of the second reference block 750, and acquire reference samples corresponding to the internal region 744 of the first reference block 740 from the non-corresponding region 754 located inside the reference picture 730.

In this way, when the inter-predictor 444 is configured to further perform the MV wrapping procedure, the location of the corresponding region 752 may be indicated through a single processing of motion vector adjustment, and accordingly the time required for inter-prediction and efficiency related to memory resources may be further improved.

In the above-described embodiment, it has been described that the MV wrapping procedure is performed only when the first motion vector points the outside of the reference picture 730. However, according to embodiments, the MV wrapping procedure may be performed even when the first motion vector points the inside of the reference picture 730.

Figure 10:
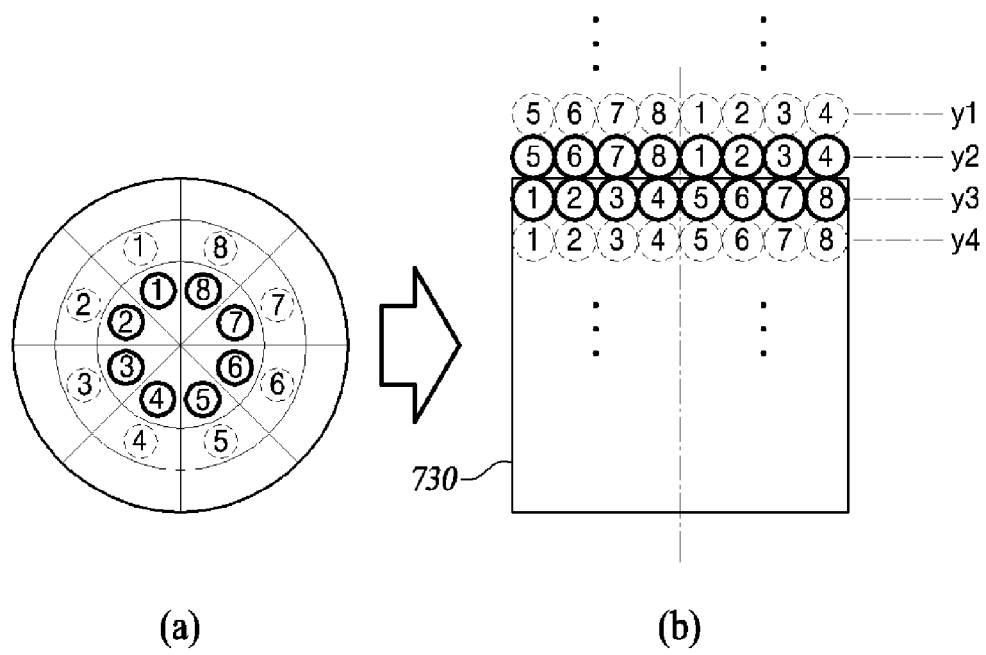
FIGS. 10 to 12 are diagrams illustrating various embodiments of the present disclosure in which reference samples are acquired based on a directional relationship between reference blocks.
Figure 11:
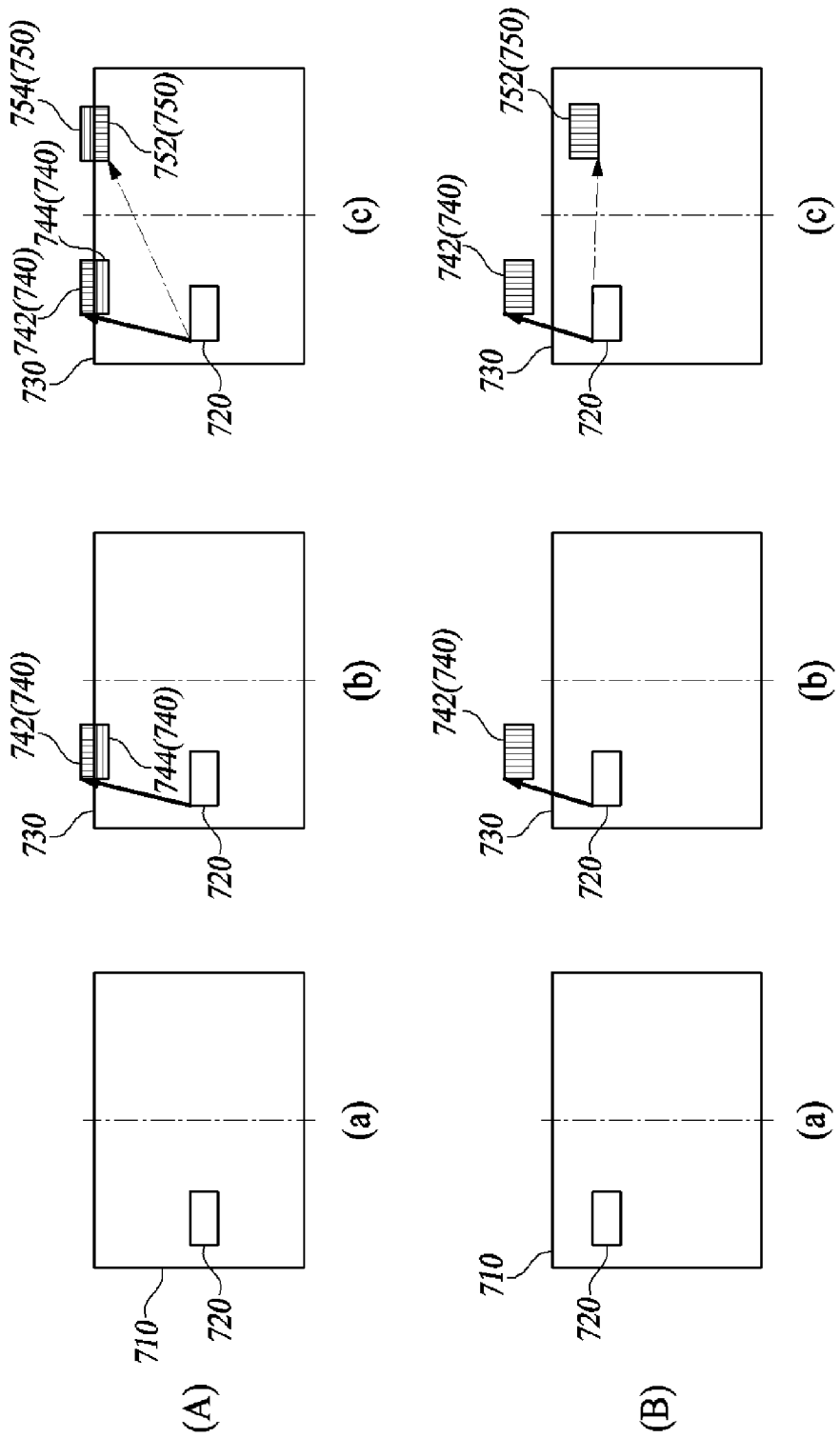
Figure 12:
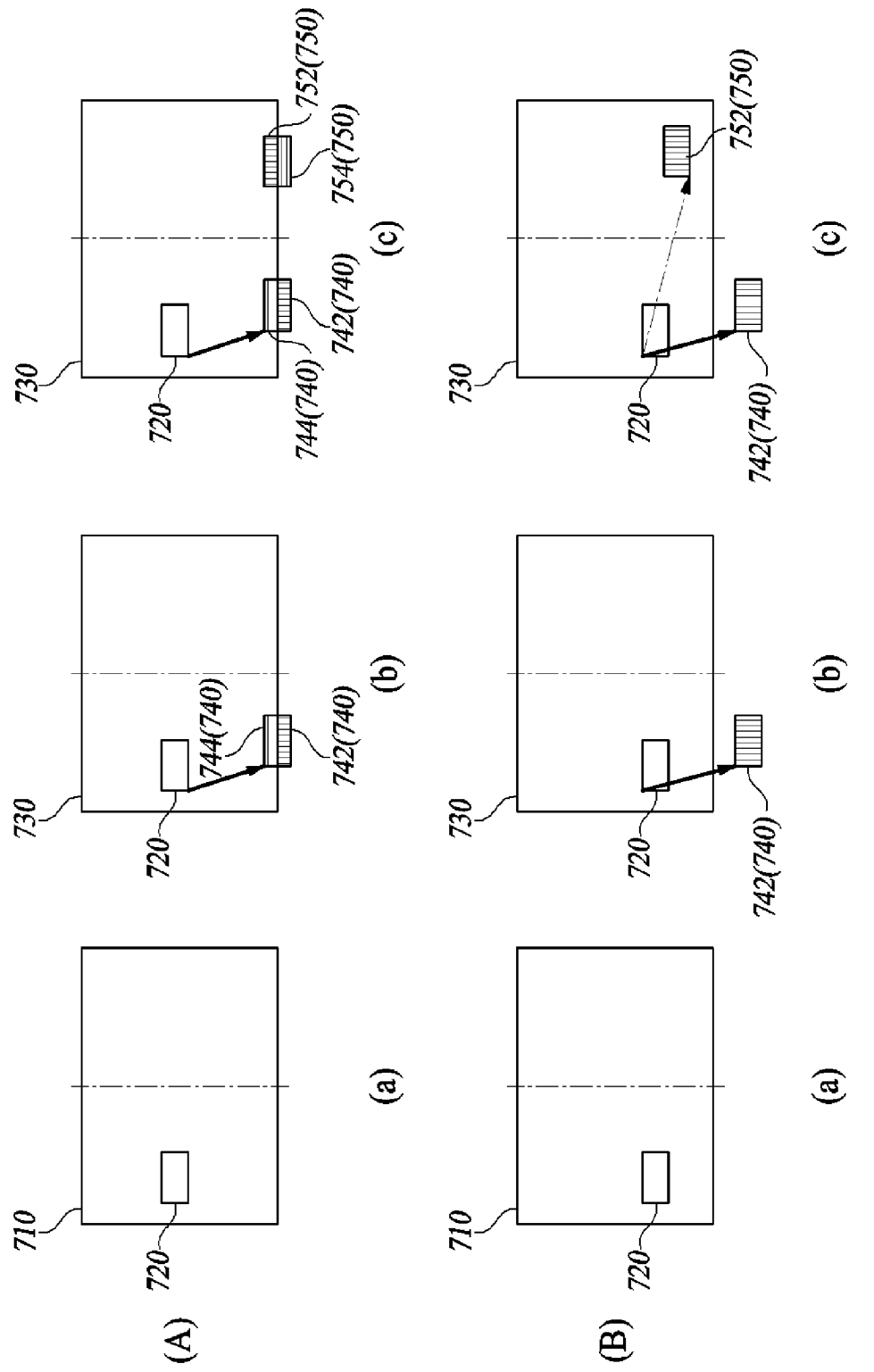

FIGS. 10 to 12 are diagrams illustrating various embodiments of the present disclosure in which reference samples are acquired based on the directional relationship between the first reference block 740 and the second reference block 750. Hereinafter, technical features of the present disclosure related to indicating a direction relationship between the first reference block 740 and the second reference block 750 and acquiring reference simples based on the indicated directional relationship will be described with reference to FIGS. 10 to 12.

The reference samples (the second reference samples) in the second reference block 750 corresponding to the reference samples (the first reference samples) in the first reference block 740 may be arranged in a different direction from the first reference samples. The directional relationship between the first reference block 740 and the second reference block 750 refers to a direction in which the second reference samples are arranged compared to the arrangement of the first reference samples.

When a 360-degree image in the shape of a 3D sphere shown in FIG. 10(a) is split, it may be transformed into a reference picture 730 having a 2D ERP format shown in FIG. 10(b). From the perspective of the 3D sphere shape, the upper sides of the reference picture 730 are in contact with each other, and accordingly solid pixels 1 to 8 corresponding to row y3 are the same pixels as solid pixels 5 to 4 corresponding to row y2. In addition, dotted pixels 1 to 8 corresponding to row y4 are the same pixels as dotted pixels 5 to 4 corresponding to row y1. The lower side of the reference picture 730 also has the same characteristics or properties.

In this state, the first reference block 740 is composed of row y1 of dotted pixels 5 to 7, row y2 of solid pixels 5 to 7, row y3 of solid pixels 1 to 3, and row 4 of dotted pixels 1 to 3, dotted pixels 5 to 7 in row y1 and solid pixels 5 to 7 row y2 correspond to the external region 742, and the corresponding region 752 corresponding thereto may be composed of solid pixels 5 to 7 in row y3 and dotted pixels 5 to 7 in row 4.

In addition, the first reference block 740 including the external region 742 and the second reference block 750 including the corresponding region 752 face in opposite directions with respect to the vertical direction of the reference picture 730. In other words, the arrangement direction of the reference samples included in the external region 742 is opposite to the arrangement direction of the reference samples included in the corresponding region 752 with respect to the vertical direction of the reference picture 730.

Accordingly, in acquiring reference samples of the external region 742 located outside the top or bottom of the reference picture 730, the reference samples must be acquired in the opposite direction to the direction of the first reference block 740 (the direction in which the reference samples included in the external region are arranged)

In view of this, the present disclosure may additionally include the relationship indicator 550 indicating a directional relationship between the first reference block 740 and the second reference block 750, such that reference samples are acquired from the corresponding region 752 according to the indicated directional relationship.

FIG. 11(A) illustrates a case where a part (external region) of the first reference block 740 is located outside the upper end of the reference picture 730, and FIG. 11(B) illustrates a case where the entirety (external region) of the first reference block 740 is located outside the upper end of the reference picture 730.

In both cases, the first motion vector may be adjusted to point indicate the outside of the reference picture 730, and the relationship indicator 550 may indicate that the second reference block 750 derived using the adjusted motion vector (second motion vector) and the first reference block 740 have a relationship of opposite directions.

The sample acquirer 520 may acquire reference samples of the internal region 744 from the internal region 744 (S640). In addition, according to the directional relationship indicated by the relationship indicator 550, the sample acquirer 520 may acquire reference samples from the corresponding region 752 in a direction opposite to the direction in which the reference samples of the external region 742 are arranged with respect to the vertical direction of the reference picture 730 (S640).

In the above-described embodiment in which the MV wrapping procedure is not performed, the relationship indicator 550 may be configured to indicate a direction relationship between the first reference block 740 and the second reference block 750 corresponding to the same region as the first reference block 740 in a 360 structure, and the sample acquirer 520 may be configured to acquire reference samples corresponding to the external region 742 from the corresponding region 752.

FIG. 12(A) illustrates a case where a part (external region) of the first reference block 740 is located outside the lower end of the reference picture 730, and FIG. 12(B) illustrates a case where the entirety (external region) of the first reference block 740 is located outside the lower end of the reference picture 730.

In both cases, the first motion vector may be adjusted to point the second reference block 750, and the relationship indicator 550 may dictate that the second reference block 750 is opposite to and the first reference block 740 in terms of the directional relationship.

The sample acquirer 520 may acquire reference samples of the internal region 744 from the internal region 744 (S640). In addition, according to the directional relationship indicated by the relationship indicator 550, the sample acquirer 520 may acquire reference samples from the corresponding region 752 in a direction opposite to the direction in which the reference samples of the external region 742 are arranged with respect to the vertical direction of the reference picture 730.

In the above-described embodiment in which the MV wrapping procedure is not performed, the relationship indicator 550 may be configured to indicate a direction relationship between the first reference block 740 and the second reference block 750, and the sample acquirer 520 may be configured to acquire reference samples corresponding to the external region 742 from the corresponding region 752.

Figure 13:
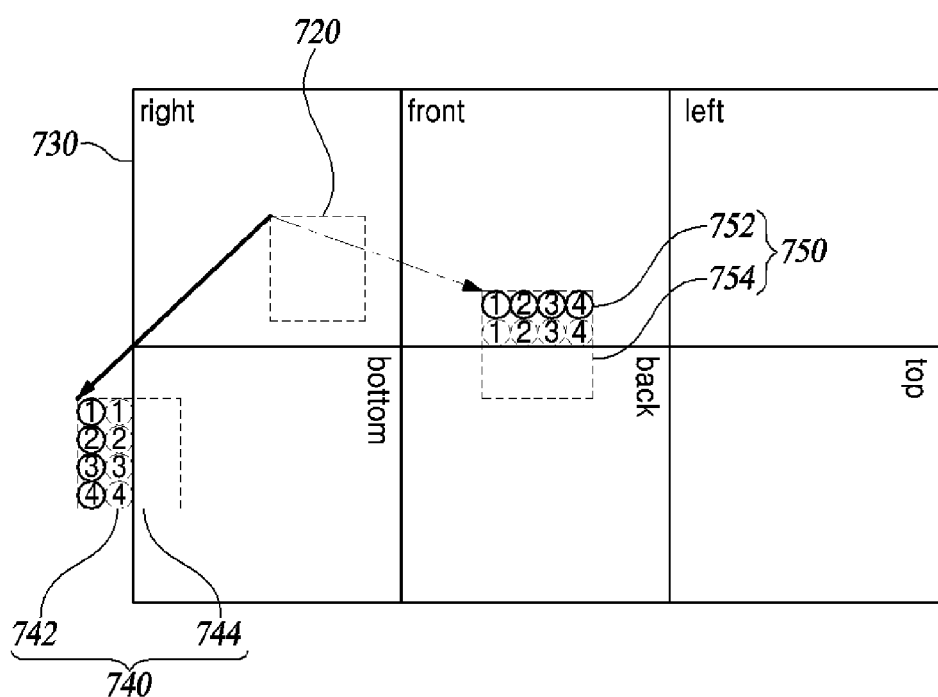
FIG. 13 is a diagram illustrating an embodiment in which the present disclosure is applied to a reference picture having a different format.

FIG. 13 is a diagram illustrating an embodiment in which the present disclosure is applied to a reference picture 730 having a different format.

As described above, the reference picture 730 may correspond to a picture obtained by transforming a 360-degree image of a 3D structure into various types of 2D formats such as ERP, CMP, and ISP. Among these various types of formats, a picture obtained by transforming a 360-degree image into the CMP format is shown in FIG. 13.

The reference picture 730 in the CMP format may consist of six faces, which are a right face, a front face, a left face, a bottom face, a back face, and a top face. In addition, as shown in FIG. 13, group 1 consisting of the right face, the front face, and the left face and group 2 consisting of the bottom face, the back face and the top face are arranged in different directions, and the reference samples included in the respective face are also arranged in different directions according to the above-mentioned arrangement relationship.

First, the motion deriver 510 may derive a motion vector (a first motion vector indicated by a solid arrow) of the current block 720 based on motion information transmitted from the video encoding apparatus, and the sample acquirer 520 may acquire reference samples of the first reference block 740 from the first reference block 740 and/or the second reference block 750.

According to an embodiment, prior to acquiring the reference samples, the first motion vector may be adjusted to point the second reference block 750 corresponding to the same region as the first reference block 740 based on the 360-degree image.

The sample acquirer 520 acquires reference samples corresponding to the internal region 744 of the first reference block 740 from the internal region 744, and reference samples corresponding to the external region 742 from the corresponding region 752 included in the second reference block 750.

According to the embodiment, when the relationship indicator 550 indicates a directional relationship between group 1 and group 2, the sample acquirer 520 may acquire reference samples corresponding to the external region 742 from the corresponding region 752 according to the indicated direction relationship. Here, the directional relationship may include positional and rotational relationships between the respective faces.

As shown in FIG. 13, the pixels in the external region 742 are arranged downward with respect to the vertical direction of the reference picture 730. The solid and dotted pixels in the external region 742 are arranged in the rightward direction with respect to the horizontal direction of the reference pictures 730. In contrast, the pixels of the corresponding region 752 are arranged in the rightward direction with respect to the horizontal direction of the reference picture 730. The solid and dotted pixels of the corresponding region 752 are arranged downward with respect to the vertical direction of the reference picture 730. In addition, the directional relationship between the pixels configured as described above may be reflected in or applied to the directional relationship between the external region 742 and the corresponding region 752, and may also be reflected in or applied to the directional relationship between the first reference block 740 and the second reference block 750.

Accordingly, the relationship indicator 550 may indicate the directional relationship between the external region (the first reference block) and the corresponding region (the second reference block) as described above, and the sample acquirer 520 may acquire pixels of the corresponding region 752 according to the indicated directional relationship.

As such, the technical features of the present disclosure related to acquiring reference samples of the external region 742 from the corresponding region 752, adjusting a motion vector, and acquiring reference samples according to a directional relationship between the reference blocks 740 and 750 are not limited to a specific projection format, but may be applied to various projection formats. Accordingly, the present disclosure may have a sufficiently wide versatility in terms of applicability.

While it has been mentioned in all embodiments of the present disclosure that one predicted block is generated according to uni-directional prediction, those skilled in the art to which an embodiment of the present disclosure belongs will appreciate that prediction may be performed in both directions to generate two predicted blocks.

The above description is merely illustrative of the technical idea of the present disclosure, and those of ordinary skill in the art to which the present disclosure belongs will understand that various modifications and variations can be made without departing from the essential characteristics of the present disclosure. Accordingly, the present embodiments are not intended to limit the technical idea of the present exemplary embodiment, but are illustrative, and the scope of the technical idea of the present disclosure is not limited by these embodiments. The scope of protection sought for by the present disclosure should be interpreted by the following claims, and all technical ideas within the scope equivalent thereto should be interpreted as being included in the scope of the present disclosure.

What is claimed is:

1. A method performed by a video decoder, the method comprising:
   determining that a current block is decoded using inter-prediction;
   deriving a motion vector of the current block based on motion information decoded from a bitstream;
   acquiring reference samples of a first reference block by using the motion vector, wherein reference samples of an external region located outside a reference picture among the first reference block are acquired from reference samples of a corresponding region corresponding to the external region within the reference picture; and
   predicting the current block based on the acquired reference samples,
   wherein the reference samples of the corresponding region within the reference picture are determined by shifting sample positions in the external region toward an inside of the reference picture by an offset determined based on a picture width.

2. The method of claim 1, further comprising:
   adjusting the motion vector to point a second reference block corresponding to the first reference block after the deriving of the motion vector,
   wherein the corresponding region is a region included in the second reference block.

3. The method of claim 2, wherein the adjusting of the motion vector is performed when the motion vector points an outside of the reference picture.

4. The method of claim 1, further comprising:
indicating a directional relationship between the first reference block and a second reference block after the deriving of the motion vector,
wherein the second reference block corresponds to the first reference block and includes the corresponding region,
wherein the acquiring of the reference samples comprises:
acquiring reference samples from the corresponding region according to the indicated directional relationship.

5. The method of claim 4, wherein the reference picture is in an equirectangular projection format for a 360-degree image,
wherein the indicating comprises:
when the external region is located outside an upper or lower end of the reference picture, indicating that the first reference block and the second reference block are opposite to each other in terms of the directional relationship with respect to a vertical direction of the reference picture,
wherein the acquiring of the reference samples comprises:
acquiring the reference samples of the corresponding region in a direction opposite to a direction of arrangement of the reference samples of the external region with respect to the vertical direction of the reference picture.

6. The method of claim 1, wherein the corresponding region is a region obtained by shifting the external region in a horizontal direction by the offset derived from offset information contained in the bitstream.

7. The method of claim 6, wherein, when the external region is located outside a left side of the reference picture, the corresponding region is obtained by shifting the external region in a rightward direction by the offset, and
wherein, when the external region is located outside a right side of the reference picture, the corresponding region is obtained by shifting the external region in a leftward direction by the offset.

8. A method performed by a video encoder, the method comprising:
determining that a current block is encoded using inter-prediction;
determining a motion vector of a current block;
acquiring reference samples of a first reference block related to the motion vector, wherein reference samples of an external region located outside a reference picture among the first reference block are acquired from reference samples of a corresponding region corresponding to the external region within the reference picture; and
predicting the current block based on the acquired reference samples,
wherein the reference samples of the corresponding region within the reference picture are determined by shifting sample positions in the external region toward an inside of the reference picture by an offset determined based on a picture width.

9. A non-transitory computer readable medium storing a bitstream containing encoded data for a block of video data, the encoded data being decoded from the bitstream by an inter-prediction coding method, the method comprising:
determining that a current block is decoded using inter-prediction;
deriving a motion vector of the current block based on motion information decoded from a bitstream;
acquiring reference samples of a first reference block by using the motion vector, wherein reference samples of an external region located outside a reference picture among the first reference block are acquired from reference samples of a corresponding region corresponding to the external region within the reference picture; and
predicting the current block based on the acquired reference samples,
wherein the reference samples of the corresponding region within the reference picture are determined by shifting sample positions in the external region toward an inside of the reference picture by an offset determined based on a picture width.

* * * * *